United States Patent [19]

Bedney

[11] Patent Number: 4,738,317

[45] Date of Patent: Apr. 19, 1988

[54] IMPLEMENT WITH TOOL FRAME SELECTIVELY LOCKABLE IN VERTICAL POSITION

[75] Inventor: Harris I. Bedney, Rock Island, Ill.

[73] Assignee: Deere & Company, Moline, Ill.

[21] Appl. No.: 935,863

[22] Filed: Nov. 28, 1986

[51] Int. Cl.⁴ ............................................. A01B 63/26
[52] U.S. Cl. .................................. 172/624.5; 172/662; 172/674; 403/92
[58] Field of Search ............... 172/269, 311, 466, 481, 172/484, 624, 624.5, 662, 674, 683; 403/92, 95; 280/474

[56] References Cited

U.S. PATENT DOCUMENTS

| | | | |
|---|---|---|---|
| 2,670,672 | 3/1954 | Markel | 172/466 |
| 3,503,625 | 3/1970 | Muller et al. | 280/474 |
| 4,632,595 | 12/1986 | Schaeff | 403/92 X |
| 4,660,654 | 4/1987 | Wiebe et al. | 172/466 X |

FOREIGN PATENT DOCUMENTS

| | | | |
|---|---|---|---|
| 696973 | 9/1953 | United Kingdom | 172/624.5 |
| 1020018 | 5/1983 | U.S.S.R. | 172/624.5 |

Primary Examiner—Richard T. Stouffer

[57] ABSTRACT

Locking structure for securing a four-bar linkage or the like on an implement in a raised position to remove an earthworking tool or row unit from ground engagement. An overcenter spring arrangement selectively biases a strap pivotally connected to one arm of the linkage toward or away from a member located on the opposite arm. When the strap is biased toward the member, raising the tool or row unit causes the strap to engage the member to prevent rocking of the linkage and thereby secure the device out of ground contact. Reversing the spring arrangement and raising the device causes the strap to move out of locking engagement with the member for normal operation. An elongated device includes pins for aiding the operator in both moving the over-center spring arrangement between positions and raising the tool or row unit.

14 Claims, 2 Drawing Sheets

IMPLEMENT WITH TOOL FRAME SELECTIVELY LOCKABLE IN VERTICAL POSITION

BACKGROUND OF THE INVENTION

The present invention relates generally to agricultural implements, and more specifically to locking structure for a tool-supporting linkage to maintain the tool in a preselected raised position with respect to supporting framework.

Agricultural implements commonly utilize linkage structure, such as a four-bar linkage, to support an earthworking tool or row unit in trailing relation to an implement frame or toolbar and to permit the tool or unit to rock vertically with respect to the toolbar when the implement is in the field-working position. At times it may become necessary to remove one or more of the units or earthworking tools from operation while permitting the others to remain operative in the field-working position. For example, a narrow row soybean planter may have planting units supported on four-bar linkages and spaced to plant fifteen inch rows. When planting corn with the same implement, every other planting unit will be rendered inoperable to provide thirty inch row spacings. During planting of the rows with the wider spacing, it is desirable to remove or raise the unused ground row units to reduce wear and tear on the unused units, to improve soil and trash flow and to reduce machine draft load. To accomplish this, the unused row units can be entirely removed from the toolbar or frame, or various types of structure may be utilized to hold the unused units off the ground. Removing the units entirely is relatively time consuming and cumbersome, and therefore is not a desirable or convenient alternative. Devices such as hydraulic powered rock shafts, winch and cable arrangements and manually installed straps secured with bolts are available but are either very costly or time-consuming to operate.

OBJECTS OF THE INVENTION

It is therefore an object of the present invention to provide improved structure for supporting one or more earthworking tools or row units in a preselected raised position with respect to a supporting toolbar or frame. It is another object to provide such structure which is less costly to manufacture and easier to operate than at least most previously available supporting devices.

It is another object of the present invention to provide an improved structure for supporting an earthworking tool or row unit in a raised position with respect to supporting framework, wherein the structure may be easily engaged or disengaged as necessary and wherein powered rockshafts, winch and cable arrangements or manually installed straps are eliminated.

It is a further object of the present invention to provide an improved structure for supporting an earthworking tool or row unit in a preselected raised position including easily engageable and disengageable lock structure for four bar linkage. It is a further object of the invention to provide a structure which can be automatically engaged and disengaged selectively when the tool or row unit is raised momentarily. It is a further object to provide such a structure with a lift arm arrangement for both raising and lowering the earthworking tool or row unit and for moving the structure between engaging and disengaging positions. It is still another object to provide such a structure which is low in cost and which may be quickly and easily operated.

BRIEF DESCRIPTION OF THE INVENTION

In accordance with the above objects, a spring-loaded link is pivotally connected to one of the vertically spaced arms of a four bar parallel linkage arrangement. A link-engaging catch member is connected to the other of the arms, and the spring-loaded structure may be positioned to bias the link either towards or away from the link-engaging member. When the link is biased away from the member, the linkage operates in the normal fashion to support the earthworking tool or row unit from the implement frame. By repositioning the spring-loaded structure to bias the link toward the member and raising the earthworking tool or row unit, the link engages the member and prevents the arms from pivoting to thereby lock the four bar linkage structure against rocking. The earthworking tool or row unit is then locked in the preselected raised position. To release the linkage and permit normal operation, the spring-loaded structure is positioned in the opposite direction to bias the link away from the member. The operator then lifts the earthworking tool or unit to cause the link to move away from the member and provide a normal rocking function. A lift tool is provided which not only aids the operator in lifting the earthworking tool or unit but also helps the operator reposition the spring-loaded structure for either engagement or disengagement of the locking mechanism.

The device is low in cost, and operates quickly and easily to secure unused row units or tools in the raised position to reduce wear, improve soil and trash flow and reduce draft load. The linkages may also be quickly and easily released from their locked position to permit the tools or row units to operate in normal fashion.

DESCRIPTION OF THE PREFERRED EMBODIMENT

Figure 1:
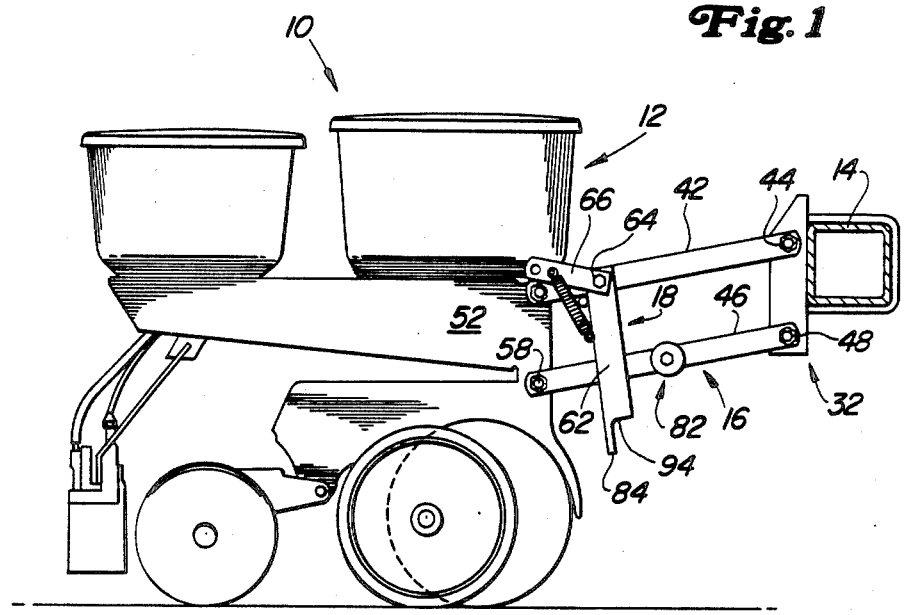
FIG. 1 is a side view of a planter row unit assembly with the locking arrangement of the present invention attached thereto and shown in the unlatched position for normal operation of the row unit.

Referring to FIG. 1, an agricultural implement 10, shown as a narrow row planter, includes a plurality of planter row units 12 supported from a transversely extending tool bar or frame 14 by linkage 16 which permits the row units 12 to move vertically while maintaining the units in a relatively constant attitude with respect to the ground. Selectively engageable locking structure 18 is provided on the linkage structure 16 and is movable between a first position (FIG. 1) wherein the linkage structure 16 is released permitting the row unit 12 to rock freely in the vertical direction, and a locking position (FIG. 2) wherein when the row unit 12 is lifted to a preselected vertical position (FIG. 3), the structure 18 locks the row unit in the preselected position out of contact with the ground. An operator assist tool 22 is provided for both engaging the locking structure 18 (FIG. 2) for movement between its two positions and for engaging the linkage structure 16 (FIG. 3) for selectively raising the row unit 12 to either engage or disengage the locking structure 18 upon repositioning of the locking structure 18.

The toolbar or frame 14 is connected to a towing vehicle such as a tractor (not shown) for forward movement over the field. The linkage structure 16 as shown includes a pair of four bar linkages 26 and 28 transversely spaced on the frame 14 by a bracket assembly 32 including rearwardly directed upright flanges 36. Each of the four-bar linkages 26 and 28 includes an upper arm 42 pivotally connected by a pivot bolt 44 to the upper portion of the corresponding flange 36. A lower arm 46 is pivotally connected by a pivot bolt 48 to the lower portion of the corresponding flange 36. The planter row units 12 each include a unit frame 52 having sides 54 spaced transversely a distance approximately equal to the transverse spacing of the bracket flanges 36. The upper and lower arms 42 and 46 extend rearwardly to pivotal connections at 56 and 58 with the respective sides 54. The spacings between the pivotal connections 56 and 58 are approximately equal to the spacings between the pivots 44 and 48 to provide a parallel linkage arrangement which maintains the unit frame 52 in a generally horizontal attitude with respect to the surface of the ground as the row unit 12 moves vertically with respect to the tool bar 14.

The locking structure 18 includes a first link or strap 62 having an upper end pivotally connected by a bolt 64 to the aft end the upper arm 42 of the linkage 28 forwardly adjacent the pivotal connection 56. A second link or strap 66 is also pivotally connected to the arm 42 by the bolt 64. A spring support pin 68 is welded to the aft edge of the strap 62 below the bolt 64. A second spring support pin 72 is welded to the outward face of the second strap 66 radially outwardly from the pin 64. A tension spring 74 is connected between the pins 68 and 72 to provide over-center operation of the strap 66. The strap 66 may be moved between a first position (FIG. 2) extending forwardly from the bolt 64 for biasing the strap 62 in a first direction (counterclockwise as viewed in FIG. 2) and a second position (FIG. 1) wherein the strap 66 extends rearwardly from the bolt 64 and urges the strap 62 in the opposite direction (clockwise) about the bolt 64. A stop member 78, which preferably is an extension of the pin 72, extends inwardly from the side of the strap 66 over the top edge of the upper arm 42 to prevent rocking of the second strap 66 in either direction beyond the first or second positions. The stop member 78 engages the top of the arm 42 in either position. A second stop member 80 extends inwardly from the upper rear edge of the strap 62 to engage the lower edge of the arm, 42, when the locking structure 18 is biased toward the unlatched position (FIG. 1), to limit rearward rocking of the strap 62 about the bolt 64.

Figure 2:
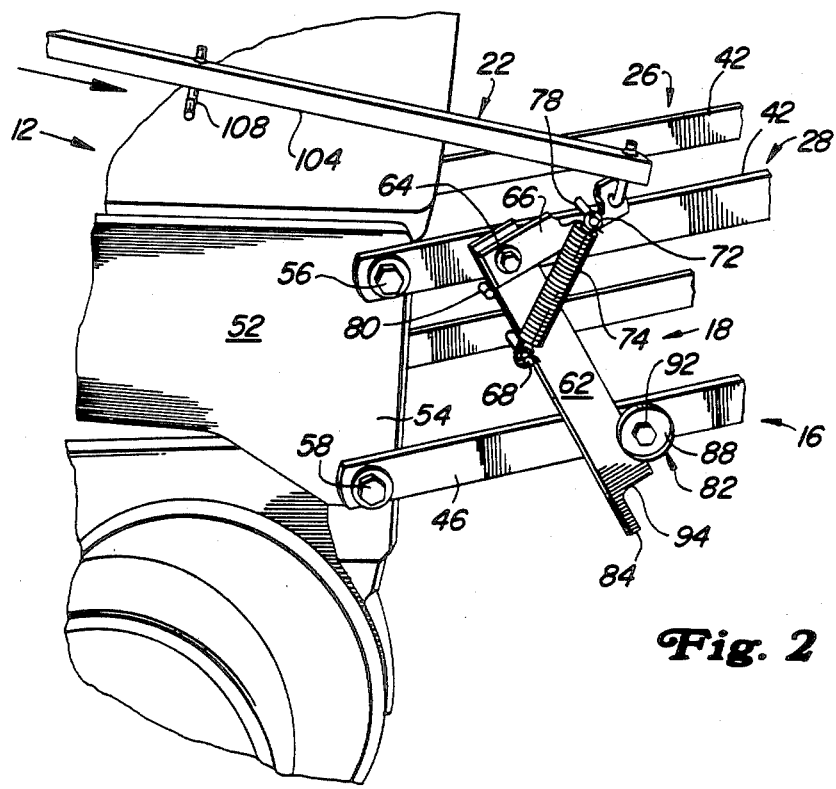
FIG. 2 is an enlarged view of a portion of the assembly of FIG. 1, but showing the locking arrangement moved to a position to facilitate locking of the row unit in a raised position.
Figure 3:
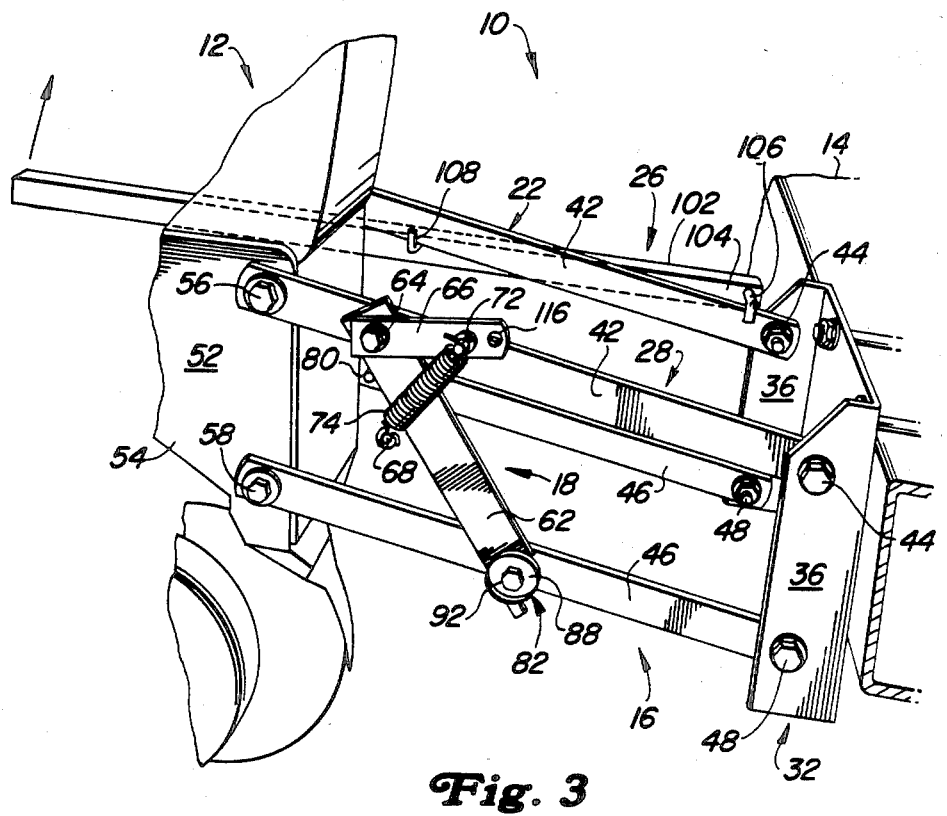
FIG. 3 is a view similar to FIG. 2, but showing the row unit assembly lifted by the lift tool to engage the locking arrangement and maintain the row unit in the preselected raised locked position.

A link engaging member 82 is connected to the lower arm 46 of the linkage 28 forwardly of the bolt 64. The first strap 62 includes a lower end 84 adapted to engage the link engaging member 82 when the second strap 66 is in the second position and the row unit 12 is lifted to a preselected upper position (FIG. 3). The member 82 includes a cup washer 88 supported on a bolt 92. The bolt 92 is secured to the lower arm 46, and a spacer (not shown) offsets the cup washer 88 a sufficient distance from the side of the arm to permit the strap 62 to slide between the washer and arm (FIGS. 2 and 3). The lower end 84 is notched at 94 so that the upper edge of the notch rests against the spacer on the bolt 92 when in the position shown in FIG. 3 to prevent downward rocking of the arms 42 and 46.

The tool 22 includes an elongated tube 102 having one face 104 with a first bent pin 106 extending outwardly from the face adjacent the forward end of the tube. A second bent pin 108 also extends outwardly from the face 104 but is bent at an angle opposite to that of the first pin 106 and is offset rearwardly (FIGS. 2 and 3) from the first pin. The pin 106 may be inserted in a hole 116 at the end of the strap 66 so that the operator may easily reposition the strap 66 as desired. Thereafter, the pin 106 is positioned over the arm 42 adjacent the pivot bolt 44 (FIG. 3) and the pin 108 is positioned under the arm 42 adjacent the pivot 56 so that the operator can easily raise the row unit 12 by lifting up on the end of the tube 102. When changing from the locked position (FIG. 3), the strap 66 is first rotated over center in the counterclockwise direction, and the row unit 12 is lifted to release the pressure of the strap 62 against the member 82 whereupon the strap 62 rotates to the position shown in FIG. 1 for normal operation. To lock up the row unit in the rasied position, the strap 66 is rotated over center in the clockwise direction (FIG. 2), and the row unit 12 is raised until the top edge of the notch 94 engages the member 82.

Having described the preferred embodiment, it will be apparent that modifications can be made without departing from the scope of the invention as defined in the accompanying claims.

I claim:

1. In an implement including a main frame, a tool frame for supporting an earthworking tool, and vertically spaced arms pivotally connected at one end to the main frame and at the opposite end to the tool frame for rockably connecting the tool frame to the main frame for vertical movement of the toolframe, means for selectively locking the tool frame in a preselected vertical position comprising:

a link;

pin means pivotally connecting the link to a first one of the spaced arms;

a link-engaging member connected to the other one of said arms;

means connected to the pin means for selectively biasing the link towards a first position offset from the link-engaging member and a second position wherein the link contacts the link-engaging member; and wherein the link includes locking means adapted for receipt by the link-engaging member when the link is biased toward the second position and the tool frame approaches the preselected vertical position for preventing rocking of the spaced arms.

2. The invention as set forth in claim 1 wherein the means for selectively biasing the link comprises an over-center spring structure.

3. The invention as set forth in claim 1 wherein the link comprises a flat strap and the link includes a lower end, said locking means including a notch located in the lower end for engaging the link-engaging member as the tool frame reaches the preselected location.

4. In an implement including a main frame, a tool frame for supporting an earthworking tool, and vertically spaced arms pivotally connected at one end to the main frame and at the opposite end to the tool frame for rockably connecting the tool frame to the main frame for vertical movement of the tool frame, means for selectively locking the tool frame in a preselected vertical position comprising:
- a link pivotally connected to a first one of the spaced arms;
- a link-engaging member connected to the other one of said arms;
- means for selectively biasing the link towards a first position offset from the link-engaging member and a second position wherein the link contacts the link-engaging member, said means for selectively biasing the link comprising an over-center spring structure connected to one of the arms and movable between a first location for urging the link in one direction about the pivotal connection of the link with the first arm and a second location for urging the link in the opposite direction about the pivotal connection,
- wherein the link includes locking means adapted for receipt by the link-engaging member when the link is biased toward the second position and the tool frame approaches the preselected vertical position for preventing rocking of the spaced arms; and
- wherein the over-center spring structure comprises a strap pivotally connected to the first arm, and a spring connected between the strap and the link.

5. The invention as set forth in claim 4 further comprising a tool including means for engaging the spring structure to move the spring structure between the first and second locations, said tool further including means for moving the tool frame towards the preselected vertical position.

6. The invention as set forth in claim 5 wherein the means for moving the tool frame includes means for engaging one of the vertically spaced arms.

7. The invention as set forth in claim 4 including a pivot connected to the first arm, wherein said pivot supports both the link and the strap.

8. The invention as set forth in claim 7 including stop means connected to the strap for preventing rocking of the strap beyond the first and second positions.

9. The invention as set forth in claim 8 wherein the stop means includes a projection adapted for engaging the first arm.

10. In an implement including a main frame, a tool frame for supporting an earthworking tool, two vertically spaced fore-and-aft extending arms, front and rear pivot means connected to the forward and aft ends, respectively, of the arms for rockably connecting the tool frame for vertical movement with respect to the main frame, means for selectively locking the tool frame in a preselected vertical position comprising:
- a link;
- pin means pivotally connecting the link to a first one of the spaced arms at a location offset from the pivot means;
- a link-engaging member connected to the other one of said arms at a location offset generally vertically from the pin means;
- means for selectively biasing the link towards a first position offset from the link-engaging member and a second position wherein the link contacts the link-engaging member; and
- wherein the link includes locking means adapted for receipt by the link-engaging member when the link is biased toward the second position and the tool frame approaches the preselected vertical position for preventing rocking of the spaced arms.

11. The invention as set forth in claim 10 wherein the means for selectively biasing the link comprises an over-center spring structure connected to one of the arms and movable between a first location for urging the link in one direction about the pivotal connection of the link with first arm and a second location for urging the link in the opposite direction about the pivotal connection.

12. The invention as set forth in claim 11 wherein the over-center spring structure comprises a strap pivotally connected to the first arm, and a spring connected between the strap and the link.

13. The invention as set forth in claim 12 wherein the strap is pivotally connected to the pin means.

14. The invention as set forth in claim 11 including stop means connected to the spring structure for contacting said one of the arms to limit the movement of the spring structure.

* * * * *